United States Patent Office 2,988,645
Patented June 13, 1961

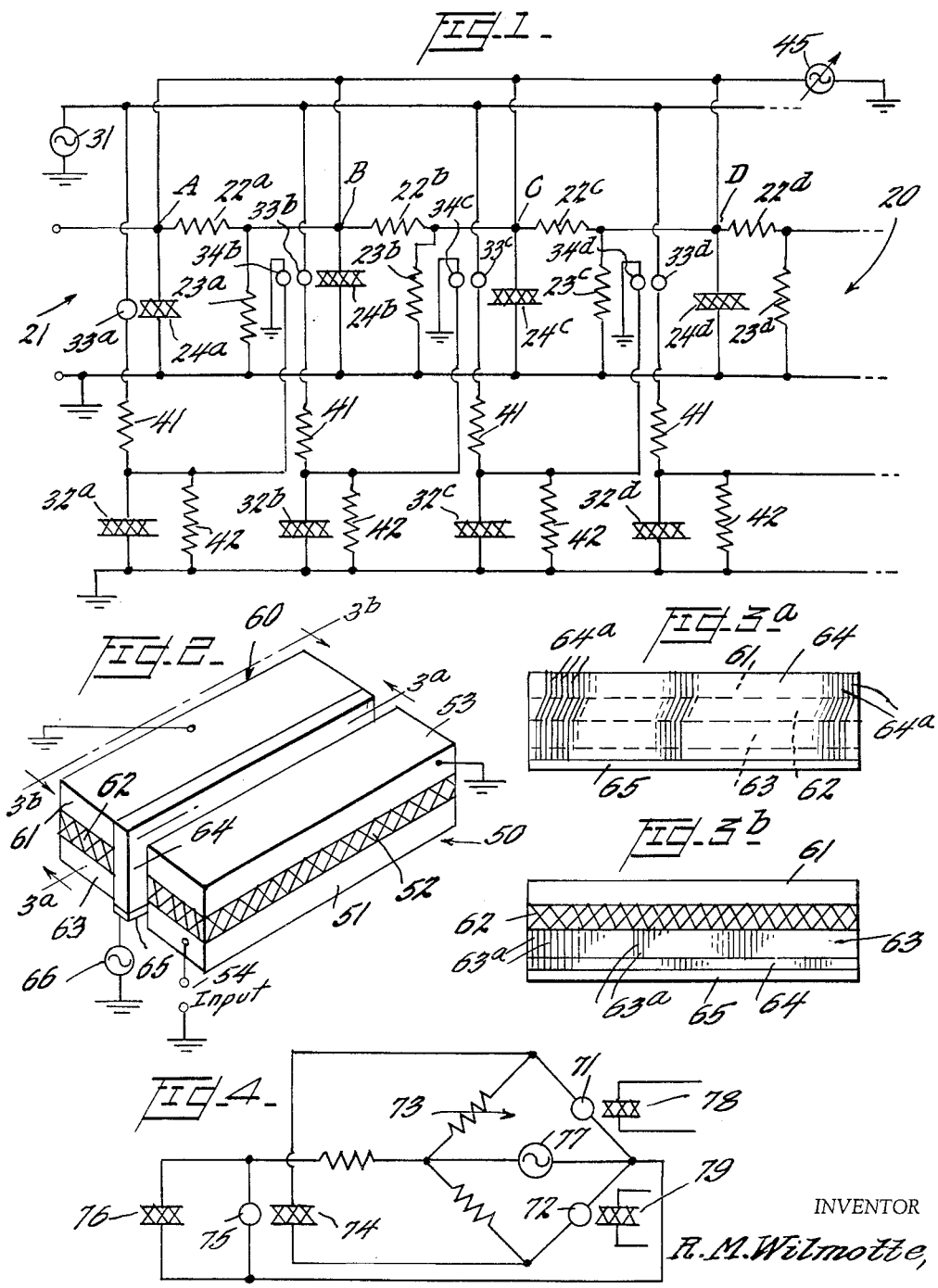

2,988,645
ELECTRICAL-OPTICAL TRANSDUCERS AND SPOT SCANNING GENERATORS
Raymond M. Wilmotte, 6 Newlin Road, Princeton, N.J.
Filed Nov. 30, 1959, Ser. No. 856,153
9 Claims. (Cl. 250—209)

The present invention relates to electrical-optical transducers and spot scanners, and more particularly to electroluminescent-photoresponsive electrical-optical transducers and spot scanners.

The phenomenon of electroluminescence is well known, and the term is used herein to denote the production of visible light by the luminescence of certain phosphors when exposed to a fluctuating electrical field. To effect this electroluminescence, it is the usual practice to disperse and imbed an appropriate phosphor material in a dielectric medium, and sandwich this phosphor-dielectric between a pair of conducting plates, thus forming a device much akin to a capacitor. Electrical leads may then be attached to the plates, and when a fluctuating electrical field of suitable magnitude and frequency is applied thereto, the phosphor luminesces. The degree of phosphor luminescence is, within limits determined by the phosphor, a function both of signal frequency and voltage magnitude. For a given electroluminescent capacitor there are usually essential thresholds of frequency and voltage below which visible luminescence will not occur, and above these thresholds the degree of luminescence is a function of these factors. In order to render the phosphor luminescence visible over a large or substantial area, it is the usual practice to utilize a light transmissive dielectric medium and a transparent conductor plate for one of the capacitor plates above referred to.

Examples of electroluminescent devices of the type here indicated, or electroluminescent capacitors or cells as they may be called, are found in the following U.S. patents:

E. L. Mager, 2,566,349
E. L. Mager, 2,624,857
W. W. Piper, 2,698,915
L. R. Koller, 2,709,765
W. W. Piper et al., 2,721,950
W. C. Gungle et al., 2,728,870
J. L. Gillson, Jr., 2,733,367

As more specifically taught in the foregoing patents, the phosphor may be zinc sulfide and/or zinc oxide, or may be from the zinc and cadmium sulfoselenide group, or may be zinc fluoride or cadmium sulfide, properly activated with small amounts of copper, lead, halogen, manganese, thallium, cerium, and/or silver. Suitable dielectric media into which the activated phosphors may be dispersed or imbedded are various light transmissive and dielectric resins, lacquers, plastics, waxes, and the like. The aforementioned transparent conductor plate may for example be a glass plate upon which is deposited a microfilm of conducting metal.

Photoresponsive devices are also well known in the art, and generally are embodied in one of two forms: either photoemissive tubes, or photoconductors such as cadmium sulfide crystals or films.

The present invention combines electroluminescent and photoresponsive devices, particularly photoconductors, to provide means for translating an electrical signal into a visual display or optical output, such as for the purpose of providing electrical meters adapted to measure the voltage or frequency of an unknown applied signal, or by the use of a controlled or known input signal pattern, to provide a light spot scanner.

In my copending application, Serial Number 795,309, filed February 5, 1959, several forms of an electroluminescent transducer or meter are disclosed. In one form, a plurality of electroluminescent cells are connected to spaced points along a resistive voltage attenuating network. In another form, an elongate voltage attenuating transmission line is utilized as one plate of an elongate electroluminescent cell. In both forms, a voltage signal applied to the attenuator causes either the separate cells, or the elongate cell, to luminesce from the input end up to a point along the attenuator where the voltage resulting from the input signal drops below the observable threshold value of the electroluminescent phosphor material. The distance of luminescence along the attenuator is therefore a measure of the voltage applied at the input of the attenuator.

The present invention utilizes both forms of the meter of the above identified copending application, and is therefore a continuation in part thereof. In accordance with the present invention, however, one obtains as an observable output a single spot or thin line of light, whose position on the scale or output face of the meter is a measure of the voltage of the input signal applied to the attenuator. Obviously, then, by a controlled input voltage, the output light spot or thin line can be caused to traverse a meter output face at a controlled or prescribed rate to produce a spot scanner. The foregoing results are accomplished generally by utilizing the attenuator-electroluminescent transducers or meters of said copending application and utilizing the length of light output to appropriately control a photoresponsive-electroluminescent output system to obtain the above-indicated spot or thin line output variable in space in accordance with the length of the light output along the attenuator-electroluminescent system. Since the degree of luminescence is a function of both voltage and frequency, as a voltage measuring or voltage responsive device, it is preferred that the frequency of the input signal be constant. The system or device may likewise be used as a frequency measuring or frequency responsive system, in which case, the voltage level of the input signal would be maintained constant, and variations in the length of the light output along the attenuator-electroluminescent system, and consequently the position of the light spot output in the photoresponsive-electroluminescent system, becomes a function of the frequency of the input signal.

It is accordingly one object of the present invention to provide electroluminescent-photoresponsive electrical-optical transducers or meters.

Another object of the present invention is to provide electroluminescent-photoresponsive transducers or meters having an optical luinescent output responsive to a characteristic of an electrical signal applied thereto.

Still another object of the present invention is to provide electroluminescent-photoresponsive electrical-optical transducers or meters responsive to the voltage and/or frequency of an applied signal.

A still further object of the present invention is to provide electroluminescent-photoresponsive devices having a luminescent spot or thin line output variable in position over the output face of the device in accordance with the voltage and/or frequency of an applied signal.

And an additional object of the present invention is to provide an electroluminescent-photoresponsive light spot scanner, whose light spot output is movable over the output face of the scanner in acordance with a characteristic of an input signal, such as the voltage and/or frequency of the input signal.

Other objects and advantages of the present invention will become apparent to those skilled in the art from a consideration of the following detailed description of exemplary specific embodiments of the invention, had in conjunction with the accompanying drawings, in which like numerals refer to like or corresponding parts, and wherein:

FIG. 1 is a schematic wiring diagram of one embodiment of the present invention;

FIG. 2 is a partially physical and partially electrical schematic representation of a second embodiment of the present invention, with the physical portion shown in perspective;

FIGS. 3a and 3b are views taken along the lines 3a—3a and 3b—3b respectively of FIG. 2; and FIG. 4 is an electrical schematic representation illustrating a third embodiment of the present invention.

Referring to FIG. 1, attention is directed first to the resistance network constituting a voltage attenuator 20, and comprising the signal input terminals 21, feeding the electrical series resistors 22a, 22b, 22c and 22d. Each of said series resistors is preferably followed by the successive shunt resistors 23a, 23b, 23c, and 23d. This combination of series and shunt resistors constitutes a voltage attenuator network designed to effect a substantial voltage drop therealong for an input signal applied to the input terminals 21.

The attenuator 20 is tapped at successive points A, B, C and D, and the voltages tapped at these points are applied across electroluminescent cells 24a, 24b, 24c, and 24d respectively. Thus, when the attenuator 20 is properly designed to effect a large degree of attenuation of the input signal applied at 21, the voltages tapped at points A, B, C, and D are successively each appreciably diminished from the voltage obtained at the preceding point. Thus, the voltages applied respectively across cells 24a, 24b, 24c, and 24d are successively less for any given input signal. Accordingly, for a given attenuator there is a range of input voltages wherein the threshold voltage of the cells 24 is obtained intermediate the ends of the attenuator, resulting in luminescence of those cells 24 preceding the threshold voltage point on the attenuator, and effective extinguishment of those cells succeeding the threshold voltage point. Thus, the greater the input voltage applied at 21, the greater is the number of cells 24 along the attenuator that are caused to luminesce; therefore, after appropriate calibration, the number of cells caused to luminesce is a measure of the input voltage applied at 21.

As thus far described, the present system is substantially identical to that disclosed in my aforementioned copending application. In accordance with the present invention, however, in order to convert the output or reading of the meter from the number of luminant cells being the measure of input voltage, to an output dependent upon the position or location of a single luminant cell, a secondary or output circuit is provided, photoconductively coupled to the attenuator associated cells 24. This output circuit comprises a bias voltage source 31 connected through a number of parallel leads across the electroluminescent cells 32a, 32b, 32c, and 32d. Electrically interposed between the bias source 31 and each cell 32 is a respective photoconductor 33a, 33b, 33c and 33d, each controlling the voltage applied from the bias source to its respective cell 32. Each photoconductor 33 is optically coupled to a respective cell 24, and therefore these photoconductors control the application of bias voltage 31 to cells 32 in accordance with the luminance states of cells 24. In addition, cells 32a, 32b, and 32c are shunted respectively by photoconductors 34b, 34c, and 34d, these photoconductors being optically coupled to cells 24b, 24c, and 24d respectively. The illuminated and non-illuminated impedances of photoconductors 33 and 34 are chosen so that when a photoconductor 33 is illuminated by its respective cell 24, and its associated series photoconductor 34 is not illuminated, the voltage from bias source 31 developed across the respective cell 32 is sufficient to luminesce that cell. However, if the associated photoconductor 34 is also illuminated by its respective optically coupled cell 24, then the voltage developed across the particular cell 32 is insufficient to cause any observable luminescence.

For purposes of illustration, one may assume an input voltage applied at 21 of such magnitude as to cause the threshold voltage for cells 24 to appear between points C and D, whereby points A, B, and C are above the threshold voltage, and point D is below the threshold voltage. Thus cells 24a, 24b, and 24c are caused to luminesce, while cell 24d is extinguished. Since photoconductors 33a, 33b, and 33c are thus all illuminated, they would pass sufficient voltage from source 31 to luminesce cells 32a, 32b, and 32c; except that in the case of cells 32a and 32b photoconductor 34b is illuminated by cell 24b and photoconductor 34c is illuminated by cell 24c, thereby shunting cells 32a and 32b and causing them to be non-luminant. In the case of cell 32c, however, since photoconductor 33c is illuminated by luminant cell 24c while photoconductor 34d is not illuminated because cell 24d is non-luminant, sufficient voltage from source 31 is developed across cell 32c to cause it to luminesce. Since cell 24d is non-luminant, photoconductor 33d is not illuminated, and cell 32d is therefore non-luminant. Thus, of the cells 32, only cell 32c is luminant. Accordingly, it will be apparent from the foregoing description, that wherever the threshold voltage for cells 24 may appear along the attenuator 20, only one output cell 32 will be luminant, thus indicating the value of the voltage applied at 21 in terms of the location of the luminance spot in the output circuit. Similarly, by applying a voltage at 21 having a value varying in time in accordance with either a desired or an unknown function, this function will be traced out in space by corresponding movement of the output light spot or luminant cell. The system can thus function as a scanning spot generator. Although illustrated as a four cell unit, the present system may be designed with any desired number of cells, and such has been indicated in the drawings by the dashed line representations following the fourth cells in the attenuator and output circuits.

In the foregoing illustrative description of operation of the present circuit, it was assumed that the location of the luminant cell in the output circuit is determined by the location of the threshold voltage along the attenuator 20. Although this is one basis of operation, it is not the only basis. Each voltage applied at input 21 establishes a voltage gradient along attenuator 20, thus causing the cells 24 to luminesce with less intensity the further removed they are from the input. The parameters of the circuit may be chosen so that at some selected light level of cells 24, the photoconductors optically coupled thereto are illuminated to an insufficient degree to affect their respective cells 32, and accordingly a particular cell 32 will not be shunted out by its photoconductor 34, and the next higher cell 32 will not be energized to luminescence. Thus, one cell 32 will be luminant, and indicative of the input voltage applied at 21.

In order to vary the operating range of the instant transducer, that is to vary the range of input voltages over which the device will respond, one may provide the variable bias source 45 connected across each of the cells 24. When operating with small input voltages, the cells 24 may be brought up close to threshold voltage or some desired level of luminence by source 45; while when operating with larger input voltages, the bias voltage across cells 24 from source 45 may be reduced well below threshold values. By this technique one can obtain a threshold voltage, or desired level of luminance of a cell 24, over a large range of input signals, thereby extending the operating range of the system beyond that obtainable without the variable bias source 45. For input signals far in excess of the range of the attenuator 20, one may of course include a voltage divider in the input to the attenuator.

Where desired and necessary, resistors 41 and 42 may be provided to control the voltages across cells 32.

The foregoing embodiment of the present invention is a step by step device. The present invention as embodied in FIGS. 2, 3a, and 3b, however, is more nearly a continuous device, and for practical purposes may be considered to be an analog embodiment of the FIG. 1 transducer. The numeral 50 denotes an elongate attenuating transmission line, comprising a first panel 51 of an electrically high resistance material, a second panel 53 of electrically conductive material, and an electroluminescent phosphor embedded in a transparent layer of lossy dielectric 52 sandwiched between the two panels 51 and 53. One end of high resistance plate 51 constitutes the signal input 54, and plate 53 is ground. Thus, the sandwich 50 constitutes a combined attenuator and electroluminescent cell, and by analogy to the above-described embodiment, results in a length of luminescence along the phosphor layer 52 which depends upon the voltage applied at the input 54.

Unit 50 is optically coupled to unit 60 by the effect of the light output of phosphor layer 52 on photoconductor layer 64 in unit 60. Considering unit 60 in greater detail, it comprises in part a somewhat conventional elongate electroluminescent cell including ground plate 61, phosphor layer 62, and a transparent conductor 63. As shown in FIG. 3b, the transparent conductor 63 is divided, as by scoring, into discrete segments 63a, so that electric current cannot flow lengthwise of the cell 60 along the conductor 63. Photoconductor layer 64 is applied along a side of cell 60, bridging the two conductive layers 61 and 63 of the electroluminescent cell 60. As shown in FIG. 3a, photoconductive layer 64 is also divided, as by scoring, into discrete segments 64a, so that electric current cannot flow therealong lengthwise of the cell 60. Each segment 64a is shaped, however, so that the portion thereof in contact with ground plate 61 is stepped forward with respect to that portion of such segment 64a in contact with the segmented transparent conductor 63. A continuous contact or electrode plate 65 bridges the segments 64a and extends along the length of the photoconductor layer 64. The electrical input to cell 60 is voltage source 66 connected across electrode 65 and ground plate 61.

Electrode 65, it should be noted, is electrically isolated from conductor 63 except through a portion of photoconductor 64. Thus, when an area of the bottom portion of photoconductor 64 is illuminated, enough voltage is established on the associated segments 63a of conductor 63 to cause cell 60 to luminesce in these areas. However, if the top and bottom portions of an area of photoconductor 64 are illuminated, then cell 60 is partially shunted, and insufficient voltage is developed across cell 60 in this area to cause luminescence.

As previously mentioned, cell 50 is optically coupled with cell 60 through photoconductor 64. Thus, when a given voltage is applied at input 54, layer 52 is caused to luminesce along cell 50 until the attenuation along cell 50 results in the voltage dropping below the electroluminescent threshold of phosphor layer 52. The resultant light line along cell 50 illuminates the entire width of photoconductor 64 up to the point along its length where the luminescence of cell 50 stops, coupling the voltage of source 66 to the segments 63a over the area where photoconductor 64 is illuminated. Because of the stepped shape of photoconductive segments 64a, it will be apparent that those segments immediately adjacent the end of the luminescent light line of cell 50 are illuminated only on their bottom portions, while all the preceding segments 64a back to those adjacent the input end of cell 50 are illuminated over both their top and bottom portions. Thus, the voltage between segments 63a of transparent conductor 63 and the ground plate 61 is effectively shunted by the photoconductor 64, except in the area immediately adjacent the end of the light line on cell 50.

A thin light line or light spot is therefore visible through transparent conductor 63 as the optical output of the present meter. It is apparent that as the light line of cell 50 becomes longer or shorter in response to the input voltage at 54 becoming larger or smaller, the light spot output of cell 60 will vary correspondingly in position along cell 60. For meter purposes, transparent conductor 63 can carry suitable calibration indicia.

Since the light spot output of the present embodiment of the invention would normally span several segments 64a and 63a, the application of a varying voltage at input 54 causes an apparent continuous corresponding travel or scan of the light spot along the face of cell 60. Thus, the present embodiment of the invention may be regarded as an analog form of meter or a continuous scanning spot generator. The expansion of the invention from a single line scanning spot generator to a plural line generator, requires but a plurality of such units as illustrated in FIG. 2; and if interrelation of the scan of the several lines is desired, such can be readily accomplished, as will be apparent to those skilled in the art, as by switching or successive energization of the lines, etc.

In the above description, the optical output has been referenced particularly to the threshold voltage of unit 50. However, by analogy to the explanation had in connection with FIG. 1, for any given input voltage, a light gradient is established along unit 50, and the parameters of the circuit may be selected to provide a light spot output from unit 60 in accordance with the location of a given level of light intensity along unit 50. Like the threshold voltage, this given level of light intensity will vary in position along unit 50 in accordance with the magnitude of the input voltage.

An additional embodiment of the invention is illustrated in FIG. 4, and comprises a Wheatstone bridge 73 having two resistance arms formed from photoconductors 71 and 72, and energized by source 77. The output of the bridge 73 is applied across cell 74, so that when photoconductors 71 and 72 are both either illuminated or non-illuminated, no voltage is applied across cell 74, and it is non-luminant. However, when one photoconductor of the bridge is illuminated, and the other is not, then cell 74 becomes luminescent. The optical output of this circuit is electroluminescent cell 76, which is shunted by photoconductor 75, in turn optically coupled to cell 74. Cell 76 is energized by source 77. Thus, when the bridge 73 is balanced, cell 74 is non-luminant, causing photoconductor 75 to be a high resistance, and causing cell 76 to luminesce. When bridge 73 is unbalanced, i.e. one photoconductor 71 or 72 is illuminated and the other is not illuminated, cell 74 luminesces, causing photoconductor 75 to become conductive, and thereby shunting and extinguishing cell 76.

Accordingly, by utilizing a plurality of circuits as shown in FIG. 4 arranged in a linear series, and luminance coupling the successive photoconductors 71 of the series with spaced electroluminescent points 78 of an attenuator-electroluminescent system such as 20 in FIG. 1 or 50 in FIG. 2, and similarly luminance coupling the successive photoconductors 72 with spaced electroluminescent points 79 of another like attenuator-electroluminescent system, one can obtain a moving spot optical output from successive cells 76. For this purpose, the two attenuator-electroluminescent systems are arranged with inputs at opposite ends of the series of FIG. 4 circuits, and the input signals thereto are chosen so that the light outputs therefrom always overlap by one FIG. 4 or output stage. Thus, one attenuator illuminates the cells 71 of successive output stages up to a given output stage, while the other attenuator illuminates the cells 72 of the output stages from the other end of the array up to said given output stage. In said given output stage, both photoconductors 71 and 72 are therefore illuminated, while only one or the other of these photoconductors is illuminated in every other output stage. From the foregoing discussion it is apparent that cell 76 of only said given stage is thereby rendered luminant. By properly controlling the relationship of the two input voltages, the present embodiment may obviously function both as a voltmeter or as a scanning spot generator, as in the case of the preceding embodiments. Also in this embodiment of the invention, as in the preceding embodiments, where reference is had to illumination and non-illumination of the photoconductors, it is understood that non-illumination also embraces the condition of some illumination, but insufficient illumination to cause a functional or operational effect on the impedance of the photoconductor involved.

In the foregoing specific descriptions, the present invention has been described particularly with respect to its application as a voltage responsive transducer, because it is expected that this would be the primary field of use of the apparatus. On the other hand, as previously explained, electroluminescence is not only a function of voltage, but also is a function of the frequency of the voltage signal. Also it is apparent that the foregoing embodiments may be used as frequency responsive transducers. For meter type applications the optical output face would of course be calibrated in terms of voltage or frequency referenced to a specific value of the other quantity.

Having thus described several specific embodiments of the present invention for the purpose of facilitating a complete understanding thereof, it is understood that the invention is not limited to the specific details or specific form thereof, and numerous modifications and variations will be apparent to those skilled in the art. For example, it is apparent that the purpose of the attenuator 20, and particularly the attenuator cell 50, is to obtain a variable length light line, variable in response to variations in applied voltage signal. Instead of an attenuator, one may obtain similar results by variation in dielectric thickness or phosphor density along the cell as set forth in the patent to Diemer, 2,755,457. Accordingly, such variations and modifications as are embodied by the spirit and scope of the appended claims are contemplated as within the purview of the present invention.

What is claimed is:

1. An electrical-optical transducer, comprising a voltage attenuating means, voltage responsive luminance means distributed along said attenuating means electrically coupled to different points thereon representative of different degrees of attentuation of a voltage signal applied to said attenuating means, and an optical output circuit comprising second voltage responsive luminance means, means for applying a luminance voltage to said second luminance means, and a plurality of photoresponsive means in electrical circuit with selected respective portions of said second luminance means and optically coupled to selected respective portions of said first luminance means for controlling the luminance of said second luminance means in accordance with the luminance condition of the first-mentioned luminance means, for causing only a limited portion of said second luminance means to be luminant in response to a given voltage signal applied to said attenuating means.

2. An electrical-optical transducer as set forth in claim 1, wherein both said voltage responsive luminance means are electroluminescent means, and said photoresponsive means are photoconductive means.

3. An electrical-optical transducer, comprising a voltage attenuating means, voltage responsive luminance means distributed along said attenuating means electrically coupled to different points thereon representative of different degrees of attenuation of a voltage signal applied to said attenuating means, and an optical output circuit comprising second voltage responsive luminance means having a plurality of portions, means for applying luminance voltage to each of said portions, first photoresponsive means in electrical series with each of said portions, and second photoresponsive means connected in parallel across each of said portions, each first photoresponsive means being optically coupled with a first portion of the first luminance means, and each second photoresponsive means being optically coupled with a second portion of the first luminance means, the electrical coupling of said first portion to said attenuating means being at a point representative of less attenuation than the point of coupling of said second portion to said attenuating means.

4. An electrical-optical transducer as set forth in claim 3, wherein both said voltage responsive luminance means are electroluminescent means, and both said photoresponsive means are photoconductive means.

5. An electrical-optical transducer, comprising a voltage attenuating means, electroluminescent means distributed along said attenuating means electrically coupled to different points thereon representative of different degrees of attenuation of a voltage signal applied to said attenuating means, and an optical output circuit comprising a plurality of electroluminescent cells, means for applying a luminance voltage to each of said cells, first photoconductive means in electrical series with each of said cells, and second photoconductive means in parallel across each of said cells, each first photoconductive means being optically coupled with a first portion of said electroluminescent means, and each second photoconductive means being optically coupled with a second portion of said electroluminescent means, the electrical coupling of said first portion to said attenuating means being at a point representative of less attenuation than the point of coupling of said second portion to said attenuating means.

6. An electrical-optical transducer, comprising a first elongate electroluminescent cell with one conductive plate thereof being of a relatively high resistance, whereby upon the application of a voltage to one end of said plate and across said cell the length of luminescence of said cell is indicative of the magnitude of voltage applied, a second elongate electroluminescent cell with one conductive plate thereof being divided transversely into a plurality of electrically separate portions, means for applying a voltage across said second cell, a plurality of first photoconductive means spaced along the length of said second cell and in electrical series with said divided plate and said means for applying a voltage, a plurality of second photoconductive means spaced along the length of said second cell in offset relation to said first photoconductive elements and electrically connecting respective portions of the two conductive plates of said second cell, said first and second cells being relatively located to couple the light output of the first cell to the photoconductive means of the second cell with said length of luminescence of said first cell extending lengthwise along said second cell.

7. A bridge circuit, comprising photoresponsive means in each of two arms thereof, means for energizing the bridge, the output of said bridge being connected across a first electroluminescent cell, and a read out circuit comprising a second electroluminescent cell, means for applying a voltage across said second cell, and photoresponsive means connected in parallel across the last-mentioned cell, the last-mentioned photoresponsive means being optically coupled with the first-mentioned electroluminescent cell, whereby said last-mentioned cell is luminant when the bridge is balanced, and non-luminant when the bridge is unbalanced.

8. An electrical-optical transducer, comprising a plurality of bridge circuits as set forth in claim 7, and further including a first means for generating a variable length light line, and a second means for generating a variable length light line, one said generating means being optically coupled to one bridge arm photoresponsive means of each bridge circuit, the other said generating means being optically coupled to the other bridge arm photoresponsive means.

9. An electrical-optical transducer, comprising means for generating a variable length light line, variable in accordance with the voltage applied thereto, electroluminescent cell means, means for applying a luminance voltage to a plurality of portions of said cell means, a first photoconductive means in electrical series with each of said portions, and a second photoconductive means connected in electrical parallel relationship with each of said portions, said first photoconductive means being optically coupled to spaced points along said generating means, and said second photoconductive means being optically coupled to spaced points along said generating means, the point of optical coupling of each second photoconductive means being offset relative to that of its respective first photoconductive means in the direction of greater length of said light line.

References Cited in the file of this patent

UNITED STATES PATENTS 2,948,816     Van Santen et al. _____ Aug. 9, 1960